Oct. 18, 1960   G. C. SIES   2,956,819
WINDOWED CONDUIT FITTING
Filed March 26, 1959
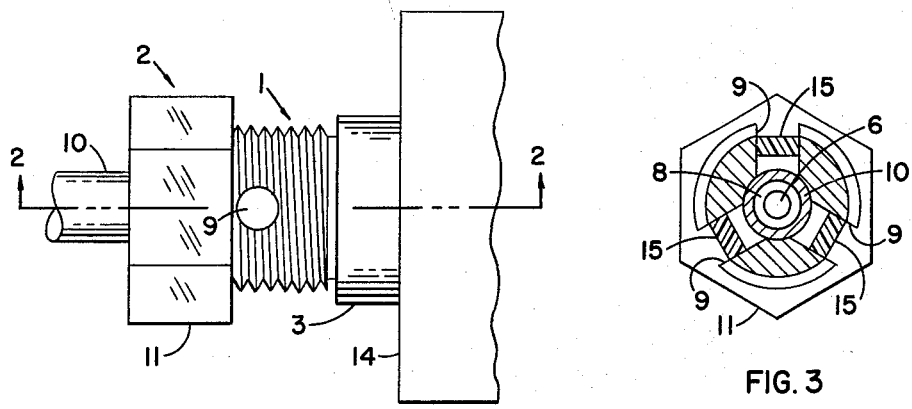
FIG. 1
FIG. 3
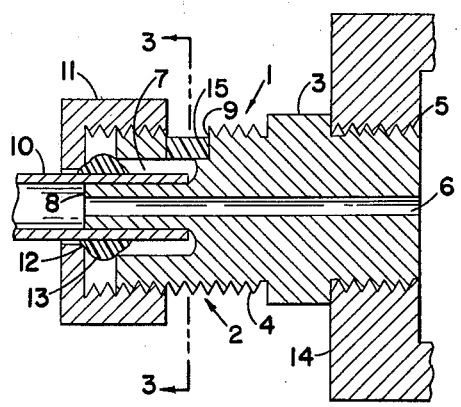
FIG. 2
Gordon C. Sies,
*INVENTOR.*
BY S. J. Rotondi,
A. P. Dupont, and
Alvin E. Moore,
ATTORNEYS

United States Patent Office 2,956,819
Patented Oct. 18, 1960

2,956,819
WINDOWED CONDUIT FITTING

Gordon C. Sies, Huntsville, Ala.
(817 Woodrow St., Arlington, Tex.)

Filed Mar. 26, 1959, Ser. No. 802,265

1 Claim. (Cl. 285—93)

(Granted under Title 35, U.S. Code (1952), sec. 266)

The invention described herein may be manufactured and used by or for the Government for governmental purposes without the payment of any royalty thereon.

This invention relates to a windowed conduit fitting. This fitting provides means for determining when a tubular member or the like, such as a hose or pipe, is properly seated.

During the assembly of a fitting on a tube, there is a need for a means of inspection of the junction of the two elements, so as to insure that the tubular member is fully seated. During use of the tube and fitting, in conveying fluids under pressure, there is a further need for a fitting with an inspection means that will allow observation of the position of the tubular member, since after attachment of the fitting, fluid, or other force may cause separation of the tube and fitting at their junction. This problem is especially present in assemblies of flexible conduits and junction fittings.

In view of these facts, an object of this invention is to provide a fitting with inspection means for insuring that a tubular member that is being attached to a fitting, is properly seated before tightening of the fitting.

Another object is to provide a fitting with inspection means which will allow observation of the position of a tubular member relative to the fitting during use of the conduit to convey fluid under pressure.

The foregoing and other objects of this invention will become more fully apparent from the following detailed description and from the accompanying drawings, in which:

Figure 1 is an elevational view showing one end of the fitting as a junction between a conduit and another member such as an air bearing housing shown as partly broken away, and with one of the inspection holes shown with the transparent plug removed.

Figure 2 is a sectional view, taken along the line 2—2 of Figure 1 showing one of the transparent plugs in position.

Figure 3 is an end view of the fitting, on a conduit, showing the location of the inspection means, with the air bearing housing (or second conduit) not shown.

In the drawings, wherein for the purpose of illustration there is shown a preferred embodiment of the invention and particularly in Figure 1, the numeral 1 designates the body of a fitting 2.

Body 1 comprises: a middle portion 3; a pair of externally threaded end portions 4 and 5, integral with the middle portion; a central bore 6 extending thru the three portions; a circular recess 7, located in end portion 4, between central bore 6 and the external threads; a cylindrical member 8, longer than portion 4, extending between recess 7 and bore 6; three equally spaced, inspection holes 9 perpendicular to and interconnecting with said circular recess 7, near its base; and a plurality of transparent members 15 adapted to be retained in said inspection holes, so as to eliminate the possibility of the inspection holes becoming filled with foreign material. These members may be eliminated in locations where there is little or no danger of the entrance of foreign material. The term "window" in this application thus is to be taken as broadly meaning a wall surface or surfaces forming an opening, with or without a transparent element in the opening.

Circular recess 7 is designed so as to receive a tubular member 10 whose bore fits over cylindrical member 8. Member 10 is positioned in recess 7, so that its end abuts the bottom of recess 7, thereby making the member visible thru inspection holes 9.

This tubular member is designed to fit a locking nut 11, which is internally threaded at one end, so that the nut can be screwed onto the threads of end portion 4. The other end of nut 11 has a reduced outlet which will allow the nut to slidably receive tubular member 10. The reduced outlet also contains a recess 12 on its inside portion.

Recess 12 is adapted to receive one end of a ferrule or gasket 13, which slidably surrounds the periphery of conduit 10. The other end of the ferrule is designed to partially enter the mouth of recess 7 when locking nut 11 is screwed on portion 4. The ferrule may be made out of material which contains resilient properties, such as flexible plastic or copper. The type of material will generally be determined by the material used in the tubular member.

The assembly of the device is as follows:

End portion 5 is attached by the screw threads, or other suitable means, to an air bearing or other device 14. Member 10 is fitted with a locking nut and ferrule. The member is positioned around cylindrical member 8, so that the end of the member engages the base of recess 7. The locking nut then is moved into engagement with portion 4.

With the locking nut in position and ready to be tightened it is important that member 10 is located in the correct position, that is, in abutment with the base of recess 7, the member's location is checked at one or more of the three inspection points.

When the conduit is correctly positioned, the locking nut is tightened until the yieldable ferrule abuts the mouth of recess 7 and recessed portion 12 of nut 11, causing the conduit to be locked in position, with an effective seal, provided by the tightness of conduit 10 or member 8, insured by the clamped ferrule and the length of the conduit on member 8.

During the securing of conduit 10 continuous inspection may be made of the position of the conduit to insure that it remains in the desired position.

The fitting is then ready for use, and while in use, inspections may easily be carried out from time to time, by means of the windows. This continued inspection is of considerable value in a pressurized system that comprises flexible conduits, such as plastic air hoses. Such a flexible conduit is subject to undesirable bendings, tending to pull the end of the hose from its sealing position within ferrule 13, and in abutment against the base of recess 7.

It is to be understood that the form of the invention, herein shown and described, is to be taken as the preferred embodiment, and that various changes in the shape, size and arrangement of parts may be resorted to, without departing from the spirit of the invention, or the scope of the subjoined claim.

The following invention is claimed:

A joint comprising: a body having a first externally threaded end portion, a second externally threaded end portion, and a cylindrical member, smaller in size and longer than said first end portion, said body being provided with a central bore throughout its length, and with an annular recess in said first end portion between the externally threaded end portion and said cylindrical member, said body further having a plurality of equally spaced inspection windows positioned around the periphery of said first end portion, extending through said externally threaded end portion of said annular recess; an internally threaded locking nut having one end with an internally threaded recess of a diameter adapted to screw on said first threaded end portion, said nut being provided with an apertured portion of a diameter smaller than said first mentioned diameter and a recess in the inner portion of said apertured portion; a flexible, plastic tubular member slidably fitted thru said apertured portion, and extending substantially thru the length of said annular recess, said tubular member being of a size that will fit closely over said cylindrical member; a compressible ferrule adapted to fit around said tubular member, said ferrule having one end surface adapted to be received in said recess in the inner portion of said apertured portion and a second end surface adapted to be received in the outer end portion of said annular recess, whereby a pressure tight fitting is provided, said windows permitting viewing of the end of said tubular member in said annular recess for insuring that the tubular member is properly extended within said annular recess and in alignment with said windows during and after assembly of the components.

References Cited in the file of this patent

UNITED STATES PATENTS

| | | |
|---|---|---|
| 1,124,575 | Zimmer | Jan. 12, 1915 |
| 2,786,696 | Feldmeier | Mar. 26, 1957 |
| 2,860,372 | Youthed | Nov. 18, 1958 |

FOREIGN PATENTS

| | | |
|---|---|---|
| 718,829 | Great Britain | Nov. 24, 1954 |